United States Patent
Abraham et al.

(10) Patent No.: US 8,339,458 B2
(45) Date of Patent: Dec. 25, 2012

(54) TECHNIQUE FOR ALLOWING THE MODIFICATION OF THE AUDIO CHARACTERISTICS OF ITEMS APPEARING IN AN INTERACTIVE VIDEO USING RFID TAGS

(75) Inventors: Subil M. Abraham, Plano, TX (US); Vinod A. Bijlani, Aundh (IN); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 11/860,185

(22) Filed: Sep. 24, 2007

(65) Prior Publication Data
US 2009/0079833 A1    Mar. 26, 2009

(51) Int. Cl.
*H04N 5/225* (2006.01)
(52) U.S. Cl. .................................... 348/169; 348/164
(58) Field of Classification Search .................. None
See application file for complete search history.

(56) References Cited

U.S. PATENT DOCUMENTS

| | | | | |
|---|---|---|---|---|
| 5,953,485 | A * | 9/1999 | Abecassis | 386/278 |
| 7,295,116 | B2 | 11/2007 | Kumar et al. | |
| 7,512,886 | B1 * | 3/2009 | Herberger et al. | 715/723 |
| 7,912,566 | B2 | 3/2011 | Lee et al. | |
| 7,920,158 | B1 * | 4/2011 | Beck et al. | 348/14.08 |
| 8,036,703 | B2 * | 10/2011 | Baker et al. | 455/556.1 |
| 2004/0105006 | A1 | 6/2004 | Laso et al. | |
| 2006/0015348 | A1 * | 1/2006 | Cooper et al. | 704/500 |
| 2006/0028552 | A1 | 2/2006 | Aggarwal et al. | |
| 2006/0129458 | A1 * | 6/2006 | Maggio | 705/14 |
| 2006/0233055 | A1 | 10/2006 | Hendrickson et al. | |
| 2006/0259862 | A1 * | 11/2006 | Adams et al. | 715/716 |
| 2006/0261938 | A1 | 11/2006 | Lai et al. | |
| 2007/0044137 | A1 | 2/2007 | Bennett | |
| 2007/0075139 | A1 | 4/2007 | Hammond et al. | |
| 2008/0235741 | A1 * | 9/2008 | Ljolje et al. | 725/89 |
| 2008/0246590 | A1 | 10/2008 | Lee | |

FOREIGN PATENT DOCUMENTS

| | | |
|---|---|---|
| KR | 2006-0092829 A | 8/2006 |
| KR | 2007-0047192 A | 5/2007 |

OTHER PUBLICATIONS

Information Materials for IDS for CHA920070012K1, dated Apr. 30, 2012.

* cited by examiner

*Primary Examiner* — Yasin Barqadle
(74) *Attorney, Agent, or Firm* — Patents on Demand P.A.; Brian K. Buchheit; Scott M. Garrett

(57) ABSTRACT

The present solution can include a method for allowing the selective modification of audio characteristics of items appearing in a video. In this method, a RFID tag can be loaded with audio characteristics specific to a sound-producing element. The RFID tag can then be attached to an item that corresponds to the sound-producing element. The video and audio of the area including the item can be recorded. The audio characteristics can be automatically obtained by scanning the RFID tag. The audio characteristics can then be embedded within the video so that the audio characteristics are available when the item appears in the video.

15 Claims, 6 Drawing Sheets

TECHNIQUE FOR ALLOWING THE MODIFICATION OF THE AUDIO CHARACTERISTICS OF ITEMS APPEARING IN AN INTERACTIVE VIDEO USING RFID TAGS

BACKGROUND

1. Field of the Invention

The present invention relates to the field of video production and, more particularly, to allowing the modification of the audio characteristics of items appearing in interactive video by using Radio Frequency Identification (RFID) tags.

2. Description of the Related Art

The medium of video encompasses the presentation of audio information in addition to visual cues. Speech, music, and a variety of sound effects enhance the user experience of watching a video recording. The quality of the audio portion of a video often depends on a variety of factors, such as the recording environment and post-production processing. For example, recording an interview in an environment with a high level of ambient noise, such as at a busy street corner, can decrease the clarity of the recorded speech.

When listening to the audio of a video recording, consumers are typically able to only control the overall volume of the audio portion. That is, increasing the volume of the interview on the street corner in an attempt to better hear the speech also increases the volume level of the recorded ambient noise. Thus, the consumer is left with the same unclear audio situation, only louder.

Independent control of the various audio channels that make up the audio track of a video is currently reserved for those who perform production tasks, such as digital re-mastering. The equipment necessary to perform such modifications is not targeted to the average consumer in a user-friendly format.

SUMMARY OF THE INVENTION

The present invention discloses a solution for allowing the modification of audio characteristics for sound-producing elements appearing within a viewing region of a data-embedded video. For example, allowing a user to adjust the volume of a piano in a concert video without altering the volume levels of any of the other instruments or sound-producing elements, such as a singer. This can be achieved by embedding configurable audio characteristics in the video using Radio Frequency Identification (RFID) tags to associate a specific audio channel with the audio output of a specific sound-producing element.

A user can make such modifications using input mechanisms normally associated with the video viewing device. For example, when the video is viewed on a television, a remote control can be used to adjust the audio characteristics. When the video is viewed on a computer, sound-producing elements can be selected by pointing to them with an on-screen pointer, which can result in the presentation of configurable options to the user.

The present invention can be implemented in accordance with numerous aspects consistent with material presented herein. For example, the present invention can include a method for allowing the selective modification of audio characteristics of items appearing in a video. In this method, a RFID tag can then be attached to an item that corresponds to the sound-producing element. The video and audio of the area including the item can be recorded. The audio characteristics for the sound-producing element can be recorded using an individual microphone and tracked within a video based upon a location of the RFID tag. The audio characteristics can then be embedded within the video so that the audio characteristics are available when the item appears in the video.

Another aspect of the present invention can include a system for embedding audio data within a video that provides independent configurable audio elements. Such a system can include a video capture system, an audio capture system, a RFID scanning system, and a merge server. The video capture system can be configured to record video of a designated area. The audio capture system can be configured to capture sounds within the designated area. The sounds can be captured independent of each other and can be represented by an item within the designated area. The RFID scanning system can be positioned proximate to the designated area and configured to scan RFID tags within the area. The merge server can be configured to automatically synchronize the audio characteristics associated with tagged sound-producing elements with the captured audio and video, producing a video with embedded modifiable audio characteristics.

Yet another aspect of the present invention can include a video playing system. The system includes a display, an audio transducer, and an input mechanism. The display can visually present video, which includes distinct sound producing elements. The audio transducer can audibly present sound for the video. The input mechanism can permit a user to select sound producing elements of the video. The input mechanism includes an audio adjustment mechanism that permits a user to adjust a sound characteristic specific to the sound producing element without adjusting any other sound characteristic of the video.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
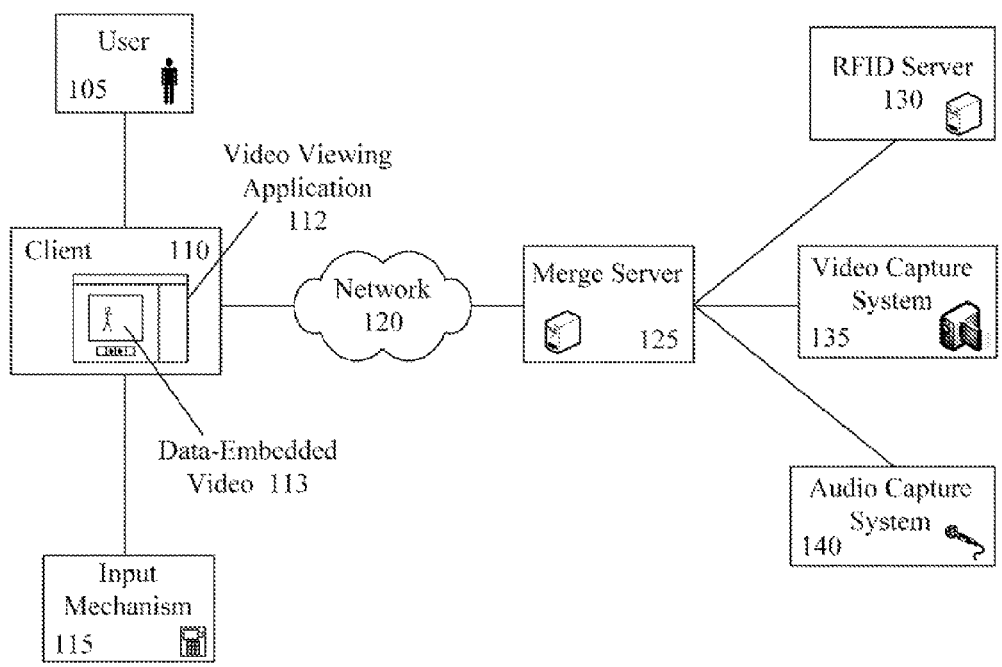
FIG. 1 is a schematic diagram illustrating a system for embedding audio characteristics produced by sound elements associated with RFID tags into a video in accordance with embodiments of the inventive arrangements disclosed herein.

FIG. 1 is a schematic diagram illustrating a system 100 for embedding audio characteristics produced by sound elements associated with RFID tags into a video in accordance with embodiments of the inventive arrangements disclosed herein. System 100 can include a client 110 configured to present a data-embedded video 113 within a viewing application 112 to a user 105. Client 110 can represent a variety of devices including, but not limited to, a personal computer, a television, a media player, or any other media viewing device or set of devices that are capable of presenting video, such as data-embedded video 113.

The data-embedded video 113 can be transmitted to the client 110 over a network 120 from a merge server 125. In another contemplated embodiment, an intermediary server or device (not shown) can exist between the merge server 125 and the network 120 in order to store the data-embedded video 113 for transmission. For example, a Video on Demand data store can store video from the merge server 125 for display upon a television (client 110). In another example, a personal video recorder connected to client 110 can store video obtained from server 125 for playback at a time convenient for user 105.

Regardless of whether the video is streamed over network 120 to client 110 or cached in a recording device and then presented upon client 110, the user 105 can interact with the elements in the data-embedded video 113. Interactions can be through an input mechanism 115 associated with the client 110. For example, when the client is a television, the input mechanism 115 can be a remote control or an input pad on the television itself. When the client 110 is a computer, the input mechanism 115 can be a mouse, a keyboard, or other such peripheral device.

The video viewing application 112 can be constructed so that it is able to run on the client 110 and accept input from input mechanism 115. The application 112 can be implemented in software, hardware, or firmware. It can also be executed from within client 110 or be executed in an external device or module linked to client 110. For example, the video viewing application 112 can be a software application or browser plug-in in which the video 113 is displayed upon a computing device (client 110). In another example, the application 112 can be included within firmware of a set-top box which interfaces with a television (client 110). Further, viewing application 112 can include locally executing instructions, remotely executing instructions, and combinations thereof. In one embodiment, the video viewing application 112 can enable the user 105 to perform digital signal processing operations against user selected elements. For example, a user 105 can select a musical instrument associated with instrument specific audio and can alter sound characteristics of the instrument using editing options included as part of the application 112.

The merge server 125 can be a computing server that includes computer software and algorithms to create a data-embedded video 113. The software and algorithms of the merge server 125 can embed the information received from the RFID server 130 and audio capture system 140 into the video received from the video capture system 135, resulting in a data-embedded video 113. The merge server 125 can receive the data from the video capture system 135, the audio capture system 140, and RFID server 130 in real-time or can be provided prerecorded data for a delayed merge. In another embodiment, the merge server 125 can include a data store (not shown) to store received data to merge later.

The merge server 125 can utilize any of a variety of audio and video processing technologies to synchronize the RFID sensor 130 information, the audio of system 140, and the video of system 135. The exact technology utilized for this synchronization is not central to the solution of system 100, and system 100 is not to be construed as limited in this regard.

The video capture system 135 can include a multitude of components for video production, such as cameras, lights, computing devices and their software, and the like. The components of the video capture system 135 can utilize a variety of and intermixing of technologies, such as analog and digital recording devices. Additionally, the raw video created by the video capture system 135 can be further processed before being sent to the merge server 125. For example, the raw video recording of a television sitcom can be edited and refined prior to being sent to the merge server 125 to have data embedded within it.

The audio capture system 140 can include a multitude of components for the capture and processing of audio signals, such as microphones, amplifiers, mixers, and the like. The raw audio created by the capture system 140 can be processed prior to being conveyed to the merge server 125. For example, background noise can be eliminated from the audio track of a speaker before being embedded in the corresponding video.

Network 120 can include any hardware/software/and firmware necessary to convey data encoded within carrier waves. Data, can be contained within analog or digital signals and conveyed though data or voice channels. Network 120 can include local components and data pathways necessary for communications to be exchanged among computing device components and between integrated device components and peripheral devices. Network 120 can also include network equipment, such as routers, data lines, hubs, and intermediary servers which together form a data network, such as the Internet. Network 120 can also include circuit-based communication components and mobile communication components, such as telephony switches, modems, cellular communication towers, and the like. Network 120 can include line based and/or wireless communication pathways.

Figure 2:
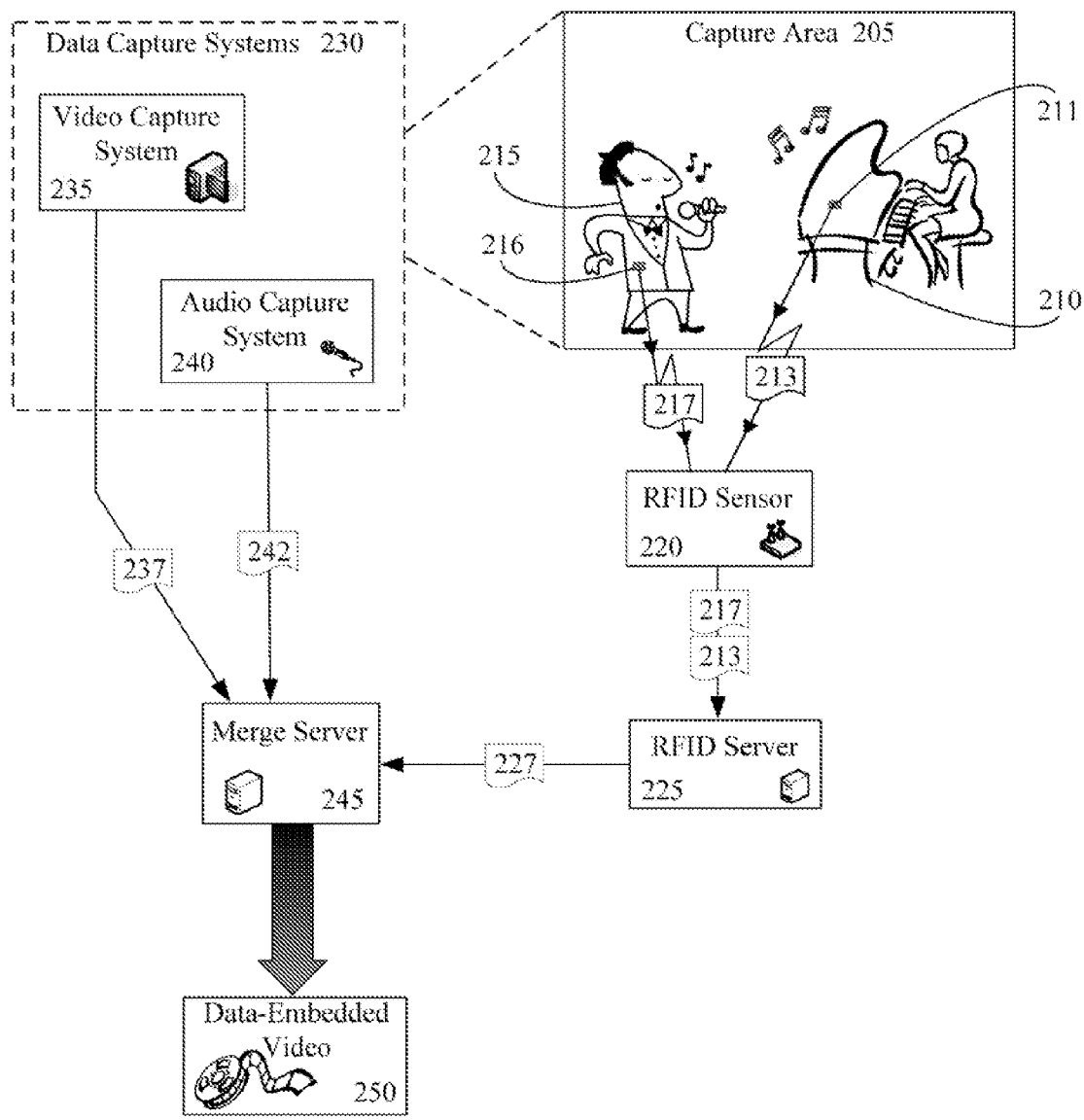
FIG. 2 is a schematic diagram illustrating a system that captures audio characteristics produced by sound elements associated with RFID tags into a video in accordance with embodiments of the inventive arrangements disclosed herein.

FIG. 2 is a schematic diagram illustrating a system 200 that captures audio characteristics produced by sound elements associated with RFID tags into a video in accordance with embodiments of the inventive arrangements disclosed herein. System 200 can be an extension to system 100. System 200 is not limited in this regard, however, and can be performed in the context of any system supporting the use of RFID tags for capturing audio characteristics to embed within a video.

In system 200, data capture systems 230 can be set up to capture data in the capture area 205. The data capture systems 230 can include a video capture system 235 and an audio capture system 240. The video capture system 235 can utilize a variety of components by which to produce a visual recording of the capture area 205, resulting in a corresponding viewing region for the generated video 237. The video capture system 235 can do so through a variety of means, including, but not limited to, camera-controlling software, manual operation, and the like. The video 237 produced by the video capture system 235 can be conveyed to the merge server 245 for data embedding.

The audio capture system 240 can utilize a variety of components by which to produce an audio recording of the capture area 205 that corresponds to the video recording of the capture area 205. The audio capture system 240 can do so through a variety of means, including, but not limited to, stationary microphones, wireless microphones, directional microphones, and the like. The audio track 242 produced by the audio capture system 240 can be conveyed to the merge server 245 for data embedding.

The capture area 205 can contain one or more sound-producing elements 210 and 215. As used herein, a sound-producing element is defined as one or more items designated as producing a specific audio stream. For example, each speaker in an interview can be designated as a sound-producing element so that their corresponding audio streams can be independently controlled. Alternately, all other noises, such as street noise should the interview be conducted outside, can be grouped together as background noise.

The sound-producing elements 210 and 215 can be placed within the capture area 205 so that their appearance and sound can be recorded. Additionally, the sound-producing elements 210 and 215 can contain RFID tags containing audio characteristics pertaining to the specific sound-producing elements. In this example, RFID tag 211 contains the audio characteristics specific to the piano and is attached to the piano; RFID tag 216 contains the audio characteristics specific to the singer and is attached to the singer. It should be appreciated that the RFID tags 211 and 216 can be attached to the sound-producing elements 210 and 215 in a variety of ways that are independent to the functionality of the overall system 200. Additionally, a RFID tag can be associated with a set of sound-producing elements, such as elements that together produce ambient audio. Thus, the RFID tag can represent a focal point for capturing/producing ambient or grouped sound, where the focal point can dynamically change as the RFID moves within the capture area 205.

The RFID sensor 220 can detect the signals of the RFID tags 211 and 216 of the sound-producing elements 210 and 215, respectively. Additionally, the RFID sensor 220 can receive data contained within the RFID tags 211 and 216. In this example, the RFID sensor 225 receives data item 213 from RFID tag 211 and data item 217 from RFID tag 216. The data items 213 and 217 can include product information, such as item details, audio characteristics, such as tone. A location of the tag within the video capture area 205 can be automatically determined by triangulating a position of the RFID tag based upon input from a plurality of RFID sensors 220.

The RFID sensor 220 can pass the data items 213 and 217 to the RFID server 225. The RFID server 225 can merge the locations and associated information for all tags for a specified time reference. This can be achieved by creating a grid mapping 227 of the location of tags with their associated information for the specified time reference. The grid mapping 227 can then be passed to the merge server 245 for synchronization with the video 237 and audio 242.

Upon receipt of the video 237 from the video capture system 235, the audio track 242 from the audio capture system 240, and the RFID location and data grid mapping 227, the merge server 245 can begin embedding the information within the video. For a specified time reference, the received grid mapping 227 can have the video 237 and audio 242 for the corresponding time reference overlaid upon it, thereby resulting in the data-embedded video 250.

Figure 3:
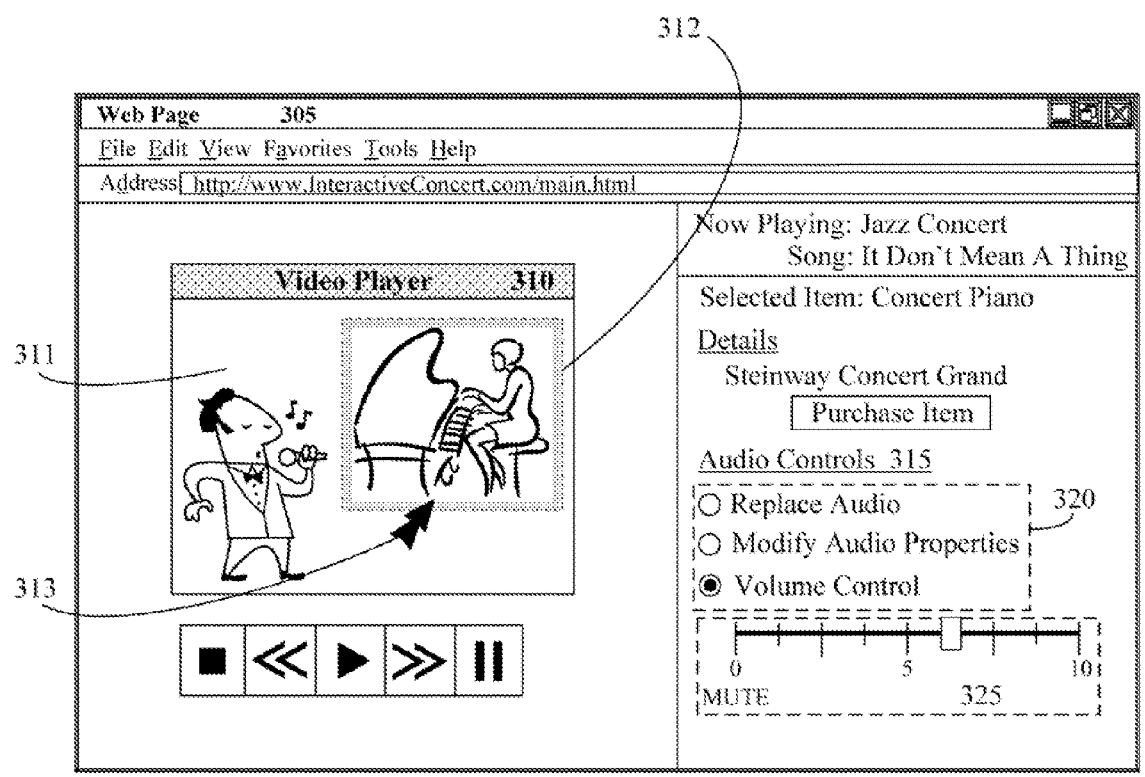
FIG. 3 is an illustration of a Web page for user interaction with a video embedded with modifiable audio characteristics in accordance with an embodiment of the inventive arrangements disclosed herein.

FIG. 3 is an illustration of a Web page 305 for user interaction with a video embedded with modifiable audio characteristics in accordance with an embodiment of the inventive arrangements disclosed herein. Web page 305 can be a means by which a user can interact with a data-embedded video, such as the data-embedded video 250 created by system 200. Any client-side application and/or interface able to interact with remote content can be substituted for the Web page 305, yet still be considered within the scope of the disclosed solution. For example, instead of a Web page 305, the interface of FIG. 3 can be implemented as a Rich Internet Application or a Rich Client Application.

In FIG. 3, a user can view the data-embedded video 311 in a video player 310 contained within the Web page 305 (or other interactive interface). The data-embedded video 311 can include a data indicator 312 to alert a user that a sound-producing element in the video 311 has modifiable audio characteristics. In this example, the data indicator 312 is visual and represented by a colored border around the element. The data indicator 312 can also be implemented in a variety of other manners, including, but not limited to, an audio alert, a pop-up window, a fly-over window, and the like. Additionally, the data indicator 312 can include a combination of multiple methods, such as a specific audio alert coupled with a change in color around the product item.

A user can elect to select the indicated sound-producing element with a selector 313. This selector 313 can have a visual representation, such as the arrow shown in the example. Additionally, the selector 313 can trigger a data indicator 312 when placed over a sound-producing element that has modifiable audio characteristics.

The selection of a sound-producing element with embedded modifiable audio characteristics can display the audio controls 315 within a section of the Web page 305. Alternately, the section of the Web page 305 displaying the audio controls 315 can appear external to the Web page 305, such as in a pop-up or fly-over window or a separate Web page.

The audio controls 315 can include a set of options 320 by which a user can select audio characteristics for modification. Selection of a specific option 320 can result in the presentation of an associated control mechanism 325 for the audio characteristic. The presentation of a control mechanism 325 can be accomplished in a variety of manners, including, but not limited to, utilizing space in the Web page 305, an external Web page, a pop-up window, a fly-over window, and the like. As shown in this example, the volume control option is selected and so a volume control mechanism 325, a slider bar, is displayed to the user in the Web page 305. The selectors 320 and control mechanisms 325 can be implemented in any manner compatible with the technology of the overall system and Web site.

A modification to the specified audio characteristic can be made within the control mechanism 325. Such a modification results in a corresponding audible change in the audio of the selected element. For example, a user can opt to slide the slider of the volume control slider bar 325 to zero ('0') to mute the piano music, resulting in the user only hearing the vocal portion.

It should be noted that the modification of the audio characteristics of one sound-producing element, does not influence the audio characteristics of another sound-producing element within the same video scene. As in the above example, changing the volume of the piano does not change the volume at which the vocal portion is played.

It should be appreciated that modifications of audio characteristics are not limited to volume, but can include any audio characteristic modification able to be performed using digital signal processing operations. For example, a guitar fitted with steel strings can be present in the video player 310 interface and can have modifiable audio characteristics. One of the characteristics can substitute different types of strings for the guitar, which results in different audio characteristics. For example, a user can be provided an option to replace the steel strings with nylon strings. The original audio melody can then be replayed, except the sound produced by the guitar is a simulated sound of that guitar having nylon strings. This concept of modifying audio characteristics can extend to other audio areas, such as changing a tempo, a pitch interval, etc. of an instrument.

In another example, the audio controls 315 can grant an ability to duplicate audio produced by one or more selected sound producing objects, where the duplicated audio has different time lags associated with the selected sound producing objects than an original audio. For instance, a user watching an orchestra perform may feet that duplicating an instrument's sound and adding some time-lag to it may improve the overall quality and effect of the entire musical piece, thus enriching his/her viewing experience.

Audio modifications are not limited to instruments. For example, speech characteristics of selected actors can similarly be modified to simulate different pitch, speaking rates, accents, languages (e.g., which in one embodiment can be dynamically translated from an original to a user selected language), a head-size, pitch, gender, and the like. Generally, the solution described herein permits any type of user specifiable digital signal processing to be performed against discrete audio sources to change an audio output generated from that audio source.

Further, when extensive modifications of an audio source are anticipated, audio information associated with that audio source can be intentionally overloaded to ensure clear audio results from user selections. For example, a guitar being advertised within a video segment can be "overloaded" to include actual music tracks produced by different variations of the guitar (e.g., steel strings versus nylon strings). Thus, selecting different audio properties 320 for the guitar can result in actual as opposed to simulated sounds from the guitar. Additionally, different actor specific audio tracks can be included for different languages, which permit viewers to select a different language for one or more actors appearing within a video. Changing a language of one actor using interface 305 does not necessarily change a language spoken by other actors appearing within a scene.

Figure 4:
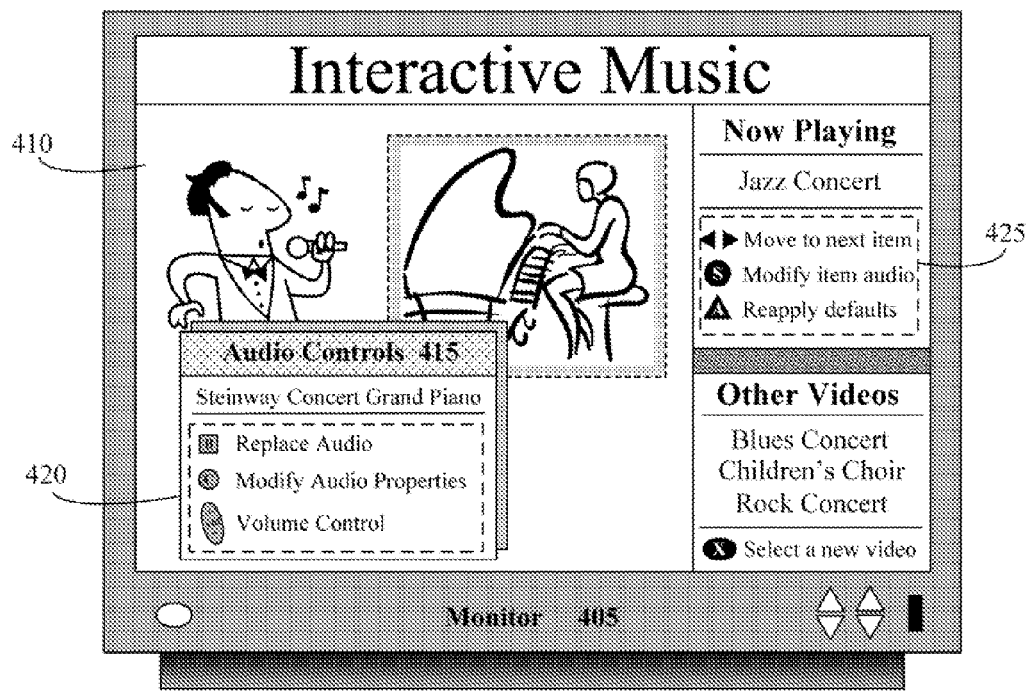
FIG. 4 is an illustration of a video monitor interface for user interaction with a video embedded with modifiable audio characteristics in accordance with an embodiment of the inventive arrangements disclosed herein.
Figure 4:
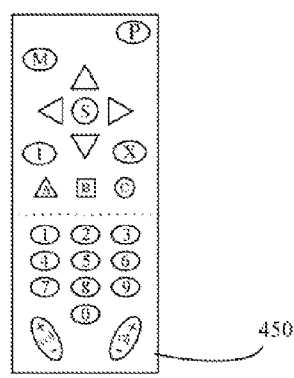

FIG. 4 is an illustration of a video monitor interface 400 for user interaction with a video embedded with modifiable audio characteristics in accordance with an embodiment of the inventive arrangements disclosed herein. This interface 400 can be a means by which a user can interact with a data-embedded video, such as the data-embedded video 250 created by system 200.

The monitor 405 can display video 410 within an environment that simulates the viewing application 112 of system 100. Alternately, the video 410 can be viewed on monitor 405 in the same manner as other programming, such as television programming, cable programming, satellite programming, ON-DEMAND movies, and the like.

A user can select of a sound-producing element within the video 410 that has modifiable audio characteristics with a remote control 450. Such a selection can trigger the display of the audio controls window 415. The audio controls window 415 can present the user with options 420 for the modifiable audio characteristics associated with the selected sound-producing element. This window 415 can remain visible for a set amount of time or until a user makes another selection.

Additional user-selectable controls 425 can be available to the user to provide general functionality. Both the audio options 420 and user-selectable controls 425 can correspond to buttons available on the remote control 450. In this example, the user-selectable controls 425 can allow a user to navigate through the sound-producing elements of the video 410, select a sound-producing element to modify, and reapply the default settings. It should be appreciated that the listed controls need to correspond to buttons available on the remote control 450 that is specifically associated with the monitor 405 or to buttons that are generally available on a variety of remote control models in order to ensure functionality.

Figure 5:
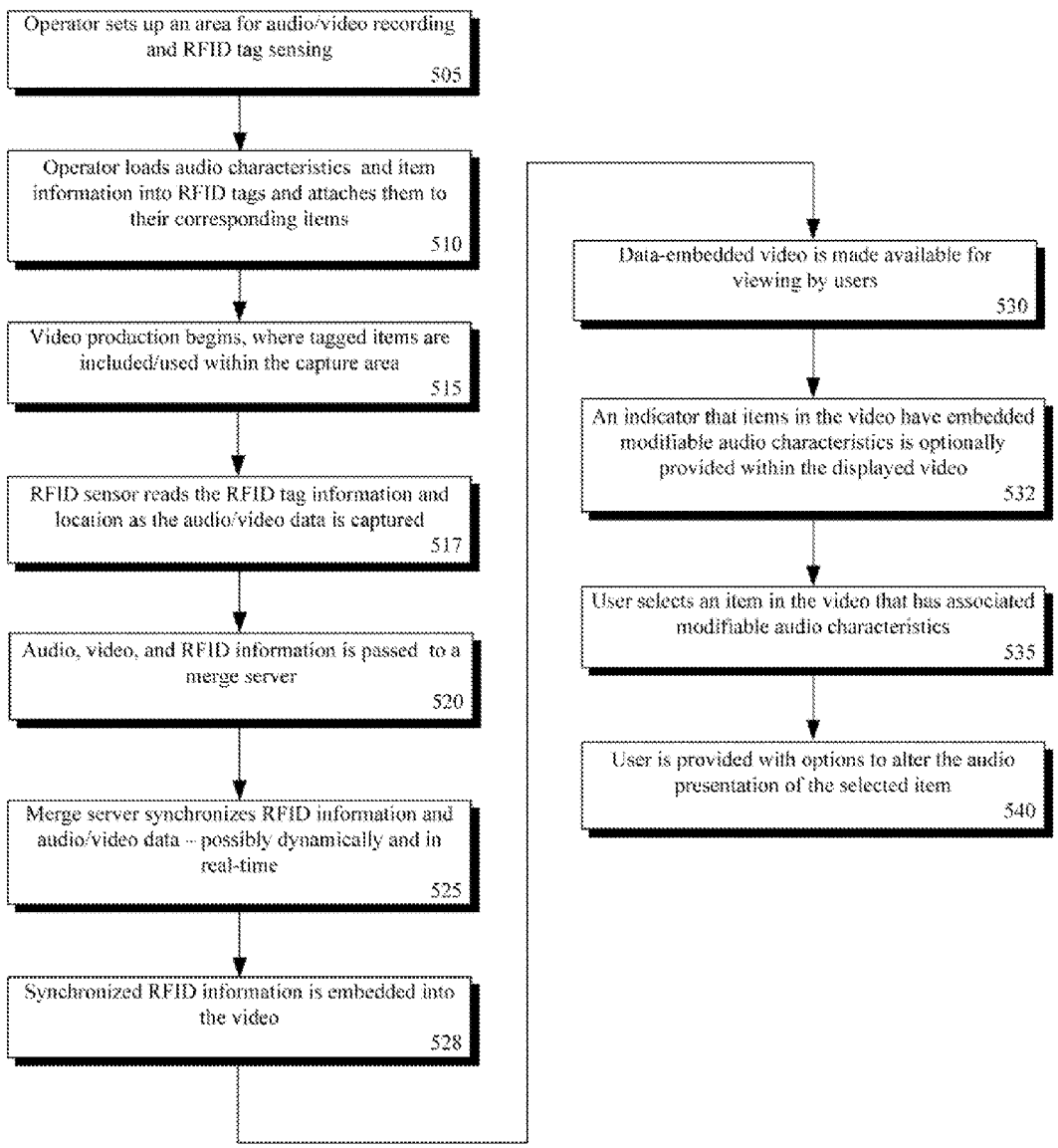
FIG. 5 is a flow chart of a method for capturing and embedding modifiable audio characteristics associated with a sound-producing element in a video in accordance with an embodiment of the inventive arrangement's disclosed herein.

FIG. 5 is a flow chart of a method 500 for capturing and embedding modifiable audio characteristics associated with a sound-producing element in a video in accordance with an embodiment of the inventive arrangements disclosed herein. Method 500 can be performed in the context of systems 100 and/or 200. Additionally, method 500 can utilize interfaces 305 and/or 400.

Method 500 can begin in step 505 where an operator sets up an area for audio/video recording and the sensing of RFID tags. This step can include the installation and configuration of the video capture system 135 and audio capture system 140 of system 100 as well as the RFID sensor 220 and RFID server 225 of system 200.

In step 510, the operator can load the RFID tags with audio characteristics and item information and can attach the tags to their corresponding items. Then, video production can begin in step 515, where the tagged sound-producing elements are included and/or used in the capture area.

While the tagged items are being recorded, one or more RFID sensors can receive the loaded information from the tags as well as determine a location of each of the tags, as indicated by step 517. In step 520, the audio, video, and RFID information can be passed to a merge server. The merge server can synchronize the RFID information with the audio and video in step 525. It should be appreciated that step 525 can occur dynamically and in real-time in regard to the recording of the tagged items.

In step 528, the merge server can embed the synchronized RFID information into the video. The data-embedded video can be made available to users in step 530. Step 532 can optionally occur where an indicator is provided to alert users that an item has modifiable audio characteristics associated with it.

In step 535, a user can select an item in the video that has modifiable audio characteristics associated with it. In step 540, the user can be provided with options to alter the audio presentation of the selected item.

Figure 6:
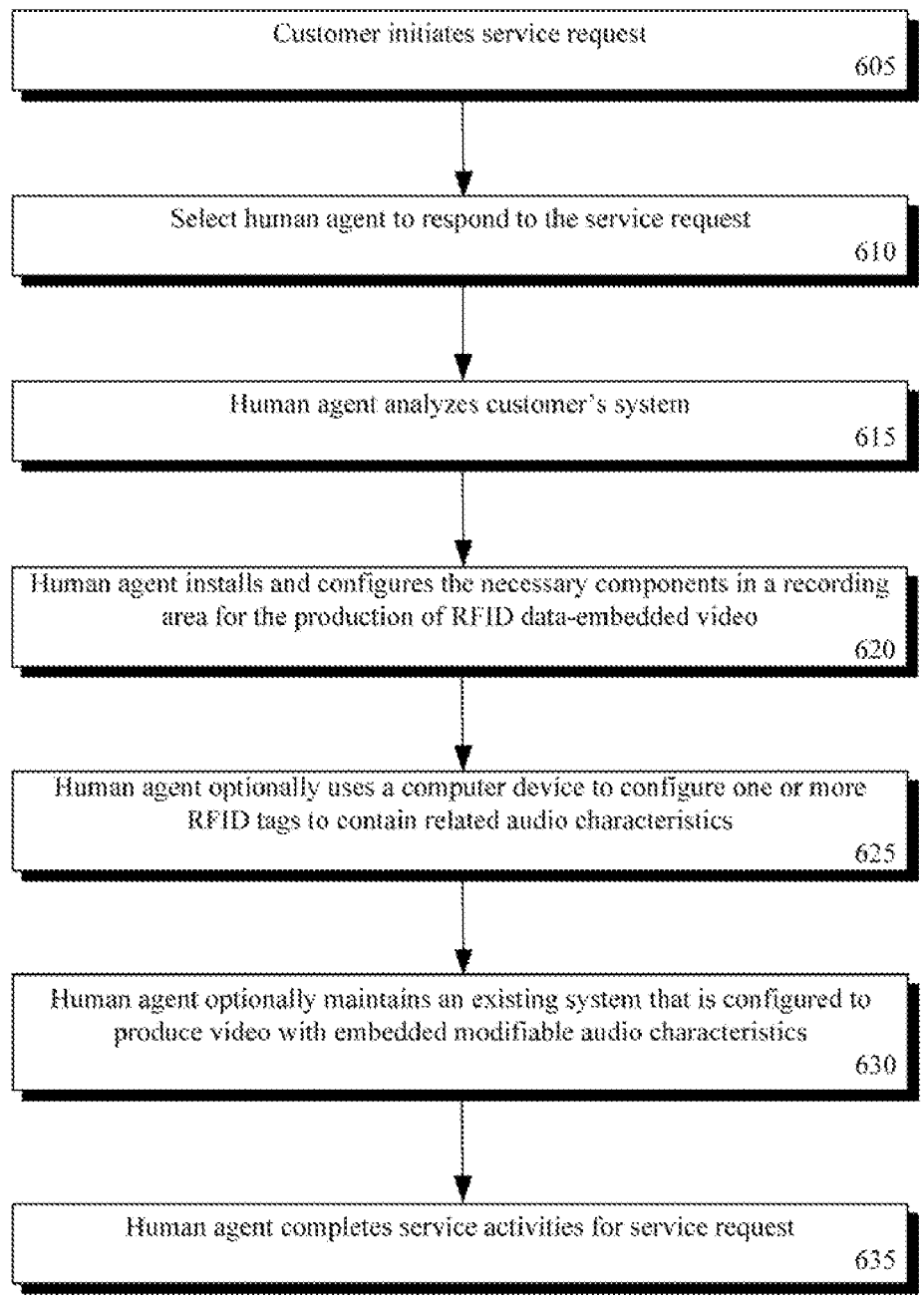
FIG. 6 is a flow chart of a method where a service agent can configure a video system to produce video with embedded modifiable audio characteristics in accordance with an embodiment of the inventive arrangements disclosed herein.

FIG. 6 is a flow chart of a method 600 where a service agent can configure a video system to produce video with embedded modifiable audio characteristics in accordance with an embodiment of the inventive arrangements disclosed herein. Method 600 can utilize system 100 and/or 200 as well as interfaces 305 and/or 400.

Method 600 can begin in step 605, when a customer initiates a service request. The service request can be a request for a service agent to establish a new system for embedding modifiable audio characteristics into a video. The service request can also be a request to troubleshoot a problem with an existing system for embedding modifiable audio characteristics into a video.

In step 610, a human agent can be selected to respond to the service request. In step 615, the human agent can analyze a customer's current system and can develop a solution. The solution can result In system 100 and/or 200, or any system configured to capture modifiable audio characteristics contained within a RFID tag on an object to embed within a video of that object, such as a system that performs the steps of method 500.

In step 620, the human agent can configure the customer's system to capture modifiable audio characteristics contained within a RFID tag on an object to embed within a video of that object. This can include the installation of a video capture system, an audio capture system, a RFID sensor, RFID server, and merge server. In step 625, the human agent can optionally use a computer device to configure one or more RFID tags to contain related audio characteristics.

In step 630, the human agent can optionally maintain an existing system that is configured to produce video with embedded modifiable audio characteristics for the customer. In step 635, the human agent can complete the service activities.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for allowing selective audio modification of items in a video containing embedded data comprising:
   configuring an audio capture system to record audio produced by one or more sound-producing elements in a capture area;
   configuring a video capture system to record video produced in the capture area including the one or more sound-producing elements;
   attaching a radio-frequency identification (RFID) tag to the one or more sound-producing elements, wherein the RFID tags are loaded with audio characteristics information and device information pertaining to the respective sound-producing element;
   recording by the video and audio capture systems video and audio produced by the one or more sound-producing elements in the capture area;
   scanning the RFID tag to collect sensor information comprising audio characteristics information and the device information loaded in the RFID tag and to automatically determine a physical location of the corresponding sound producing element relative to a position in the area;
   mapping the collected sensor information and location information with the recorded audio to produce configurable audio; and
   embedding the configurable audio within the video, wherein an end-user is able to selectively modify one or more audio characteristics of a specific one of the one or more sound-producing elements in the embedded video without producing a corresponding change in the audio characteristics of one other of the one or more sound-producing elements in the embedded video.

2. The method of claim 1, wherein the one or more audio characteristics include at least one of pitch, tone, quality, and volume.

3. The method of claim 1, further comprising:
   visually presenting an interface within a display of a device; and
   displaying one or more options to modify the one or more audio characteristics of at least one of the one or more sound producing elements appearing within the display responsive to input provided via an input mechanism associated with the device.

4. The method of claim 3, wherein the one or more options includes at least one of replacing an audio output of the at least one of the one or more sound-producing elements and adjusting a level of intensity of an audio characteristic for the at least one of the one or more sound-producing element.

5. The method of claim 3, wherein the device is a television, wherein the input mechanism is a remote control.

6. The method of claim 3, wherein the device is a computer, and wherein the input mechanism is at least one of a mouse, a touchpad, a keyboard, a trackball, a pointing stick, and a touch screen.

7. The method of claim 3, wherein the video comprises a plurality of actors, wherein at least one of the actors is a sound producing element, wherein the end-user is able to select the actor and adjust a sound characteristic of the selected actor, said sound characteristic including a volume of the actor, wherein changing the volume of the actor does not change the volume of other non-selected actors and other sound-producing elements appearing in the video.

8. The method of claim 1, further comprising:
   automatically determining a location of the one or more sound-producing elements within the capture area by determining a location of the RFID tags in the capture area; and
   ascertaining a location in a viewing region of the video that corresponds to the determined location of the one or more sound-producing elements, wherein the ascertained location is embedded within the video with the one or more audio characteristics.

9. The method of claim 8, wherein the recording, scanning, mapping, and embedding steps occur automatically for the duration of the video.

10. The method of claim 8, wherein a plurality of items associated with RFID tags continuously enter and exit the capture area during the duration, wherein the steps of claim 1 apply to each of the plurality of items, and wherein the recording, scanning, mapping, and embedding steps occur automatically.

11. The method of claim 8, wherein the recording, scanning, mapping, and embedding steps occur in at least one of real-time and near real-time.

12. The method of claim 1, wherein the steps of claim 1 are performed by at least one of a service agent and a computing device manipulated by the service agents, the steps being performed in response to a service request.

13. A computer program product comprising:
   one or more non-transitory recording storage mediums;
   program instructions, stored on at least one of the one or more storage mediums, to configure an audio capture system to record audio produced by one or more sound-producing elements in a capture area;

program instructions, stored on at least one of the one or more storage mediums, to configure a video capture system to record video produced in the capture area including the one or more sound-producing elements;

program instructions, stored on at least one of the one or more storage mediums, to attach a radio-frequency identification (RFID) tag to the one or more sound-producing elements, wherein the RFID tags are loaded with audio characteristics information and device information pertaining to the respective sound-producing element;

program instructions, stored on at least one of the one or more storage mediums, to record by the video and audio capture systems video and audio produced by the one or more sound-producing elements in the capture area;

program instructions, stored on at least one of the one or more storage mediums, to scan the RFID tag to collect sensor information comprising audio characteristics information and the device information loaded in the RFID tag and to automatically determine a physical location of the corresponding sound producing element relative to a position in the area;

program instructions, stored on at least one of the one or more storage mediums, to map the collected sensor information and location information with the recorded audio to produce configurable audio; and program instructions, stored on at least one of the one or more storage mediums, to embed the configurable audio within the video, wherein an end-user is able to selectively modify one or more audio characteristics of a specific one of the one or more sound-producing elements in the embedded video without producing a corresponding change in the audio characteristics of one other of the one or more sound-producing elements in the embedded video.

14. The computer program product of claim 13, further comprising:
   program instructions, stored on at least one of the one or more storage mediums, to visually present an interface within a display of a device; and
   program instructions, stored on at least one of the one or more storage mediums, to display one or more options to modify the one or more audio characteristics of at least one of the one or more sound producing elements appearing within the display responsive to input provided via an input mechanism associated with the device.

15. The computer program product of claim 13, further comprising:
   program instructions, stored on at least one of the one or more storage mediums, to automatically determine a location of the one or more sound-producing elements within the capture area by determining a location of the RFID tags in the capture area; and
   program instructions, stored on at least one of the one or more storage mediums, to ascertain a location in a viewing region of the video that corresponds to the determined location of the one or more sound-producing elements, wherein the ascertained location is embedded within the video with the one or more audio characteristics.

* * * * *